Patented May 14, 1940

2,200,543

UNITED STATES PATENT OFFICE 2,200,543

AZO COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application August 25, 1939, Serial No. 291,934

9 Claims. (Cl. 260—205)

This invention relates to azo compounds and to textile materials colored therewith. More particularly it relates to azo compounds having the general formula:

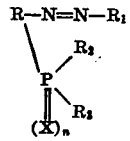

wherein R represents an aryl nucleus of the benzene series having a phosphorus containing group as a substituent thereof, the said group being joined through the phosphorus atom to a carbon atom of the nucleus which is ortho, meta, or para to the azo group, $R_1$ represents a member selected from the group consisting of a benzene nucleus, a naphthalene nucleus, and a heterocyclic nucleus, X represents an atom of oxygen or sulphur, $n$ represents zero or the numeral 1, and $R_2$ and $R_3$ each represent a member selected from the group consisting of an amino group, an alkyl substituted amino group, an aryl substituted amino group, a cycloalkylamino group, a tetrahydrofurfurylamino group, an alkylene amino group, a carbamino group, an aminopyridylamino group, and the group OZ, wherein Z represents a member selected from the group consisting of hydrogen, an alkyl group, an aryl group, and an alkali forming metal such as sodium, potassium, calcium, and the like. The various nuclei may be further substituted by monovalent substituents including halogen, nitro, hydroxyl, alkyl, amino, substituted amino and similar kind of groups.

It is an object of our invention, therefore, to prepare the class of azo compounds above described and to color fibrous cellulose organic derivatives such as cellulose acetate, silk and wool in the form of threads, yarns, fibers, and fabric materials therewith.

The azo compounds of the invention may be prepared by coupling various suitable aromatic compounds with the diazo salts of arylamines having the general formula:

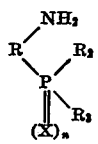

wherein R, $R_2$, $R_3$, X and $n$ have the values previously designated. These intermediates may be obtained by treating in finely divided state an ortho-, meta-, or para-nitrophenyl phosphorus dichloride, or a nitrophenyl phosphorus oxydichloride, or a nitrophenyl phosphorus sulphodichloride, which compounds are obtainable by the methods described by J. N. Friend, "Textbook of Inorganic Chemistry, volume XI, part 3, chapter 2, Charles Griffin & Co., London", with an excess of aqueous ammonia added in small portions with violent stirring, maintaining meanwhile a temperature approximately 5° C. After 1 hour, the reaction mixture is allowed to rise to room temperature, and the crystalline compound formed is filtered off, washed and dried. The benzene nuclei of the nitrophenyl phosphorus halides may or may not, as desired, be substituted by one or more other monovalent substituents of the kind previously mentioned. In place of aqueous ammonia, there may be substituted other amidation reagents including the simpler alkylamines such as methylamine, dimethylamine, ethylamine, ethanolamine, and the like, as well as amines which contain a carbonyl group illustrated by urea and its derivatives, and amines including morpholine, tetrahydrofurfurylamine, cyclohexylamine, allylamine, aniline, methylaniline, and similar kind of compounds. If the nitrophenyl phosphorus halides are treated with water or an aliphatic or aromatic alcohol instead of with an organic derivative of ammonia, there are obtained the corresponding acid and ether derivatives of the phosphorus group.

The amidated, hydrolyzed, or etherized nitrophenyl phosphorus compounds obtained by the above processes are then reduced to the corresponding amines, which form the intermediates for the preparation of the azo dyes of our invention, by dissolving the particular compound in dioxane and hydrogenating over nickel at 75–125° C. at a pressure greater than atmospheric. The reaction is complete in a few minutes, after which the nickel is filtered out, and the hot filtrate decolorized with charcoal. The solution is then concentrated by heating under reduced pressure, and the crystals thus obtained are filtered off, washed and dried.

The following examples illustrate the preparation of some of the azo compounds of our invention.

Example 1

1 mole of p-aminobenzene phosphonamide is placed in 1500 ccs. of water containing 250 ccs. of hydrochloric acid, ice added, and the amine diazotized by adding 69 grams of sodium nitrite. The diazo solution thus prepared is added to a cold aqueous solution containing 1 mole of p- cresol and 100 grams of sodium hydroxide. When the coupling reaction is complete, the mixture is made acid to litmus indicator with a mineral acid, and the dye filtered off, washed and dried. Cellulose acetate is colored yellow shades from an aqueous solution of the dye, which may contain either salt or acid, or both.

The azo compound obtained has the formula:

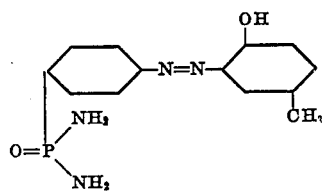

In place of p-cresol there may be substituted α-naphthol, β-naphthol, 1 - naphthol - 5 - sulfonic acid, and 2-naphthol-3,6-disulfonic acid. The coupling components above mentioned which contain a sulfonic acid group give dyes which color silk and wool reddish-orange shades from aqueous solutions of the dyes which may contain salt, or acid, or both.

*Example 2*

The diazo solution of Example 1 is added to a well iced aqueous solution containing 126 grams of methyl dihydroresorcinol and 300 grams of sodium carbonate. When coupling is complete, the mixture is made acid to litmus indicator with a mineral acid, and the dye filtered off, washed and dried. Cellulose acetate is colored yellow shades from an aqueous suspension of the dye which may contain salt, or acid, or both.

The azo compound obtained has the formula:

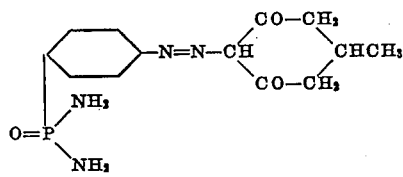

In place of methyl dihydroresorcinol there may be employed 1-sulfophenyl-2-methyl-5-pyrazolone, 3-methyl-5-pyrazolone, 2, 4-dihydroxyquinoline, pyridine, acetoacetanilide, sulfoacetoacetanilide, diketohydrindene, isobarbituric acid, hydantoin, phenylhydantoin, and similar kind of compounds.

*Example 3*

The diazo solution of Example 1 is added with stirring to a well iced dilute hydrochloric acid solution containing 140 grams of β-hydroxyethyl-m-toluidine. The coupling reaction is completed by adding sodium acetate, after which the dye is filtered off, washed and dried. Cellulose acetate is colored greenish-yellow shades from an aqueous solution of the dye, which may contain salt, or acid, or both.

The azo compound obtained has the formula:

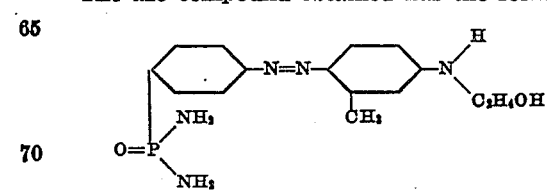

In place of β-hydroxyethyl-m-toluidine there may be substituted β-hydroxyethyl-m-anisidine, β-sulfoethyl-m-toluidine, β-sulfatoethyl-2-methoxy-5-chloroaniline, ethyl-β-hydroxyethylaniline, methyl-β-hydroxyethylaniline acetate, ethyl glycerylaniline, α-hydroxypropyl diphenylamine, di-β-hydroxyethylaniline, β-hydroxyethylglyceryl aniline, dimethylaniline, methylethylaniline, methyl propyl-m-toluidine, methyl butyl cresidine, methyl benzyl-m-anisidine, m-dimethylaminobenzene sulfonic acid, ethyl allyl-2, 5-dimethoxyaniline, ethyl-β-methoxyethyl-m-toluidine, m-toluidine, cresidine, β-methoxyethyl-α-naphthylamine, and 1-amino-5-naphthol.

*Example 4*

1 mole of p-aminobenzene phosphonamide is diazotised and coupled with 1 mole of m-phenylene diamine following the procedure described in Example 3. The azo compound obtained has the formula:

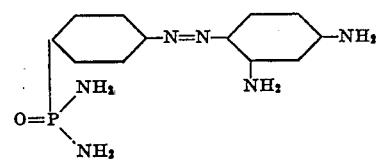

In place of m-phenylene diamine, we may employ a number of substituted m-phenylene diamines including 2, 4-diaminotoluene, 2, 4-diamino anisol, 2, 4-diaminophenol, 1, 3-diamino napthalene, 2, 4-diaminobenzamide, m-monomethyl phenylene diamine, 2-methyl-5-ethylamino-ethylaniline, 4-methoxy-3-β-hydroxyethylamino phenyl glycineamide, 2-hydroxy-5-cetylamino-β-sodium sulfatoethylaniline, 2-methyl-5-ethylamino-glycerylaniline, m-ethylamino-β-sodium sulfoethylaniline m-tetramethyl-phenylene diamine, 2, 4-diamino phenylsulfonamide, m-β-hydroxyethylamino-aniline, m-β-methoxyethylamino-aniline, m-β-sulfatoethylamino-ethylaniline, m-β-sulfoethylamino-methylaniline, m-γ-hydroxypropyl-amino-β-hydroxyethylaniline, and corresponding compounds substituted by one or more substituents such as a sulfonamide group, a mercapto group, a thioalkyl group, a carboxyamide group, a halogen atom, a phosphonamide group, and the like. Likewise in place of p-aminobenzene phosphonamide, we may employ any of the other diazotization components appearing in the specification. Most of the above compounds are valuable dyes for coloring cellulose acetate, and in addition appear to have physiological properties of value in the treatment of diseases caused by microorganisms of the streptococci type.

*Example 5*

The diazo solution of Example 1 is added to a concentrated aqueous solution of 1 mole of 1-napthylamine-5-sulfonic acid, and the coupling reaction completed by adding sodium bicarbonate, after which the dye is salted out, filtered and dried. Silk and wool are colored orange shades from aqueous solutions of the dye, which may contain either salt or acid, or both.

The azo compound obtained has the formula:

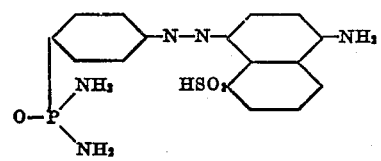

In place of 1-napthylamine-5-sulfonic acid, there may be substituted 1-naphthylamine-6-sulfonic acid, 1-naphthylamine-3, 6, 8-trisulfonic acid, 1- cetylnaphthylamine-4, 5-disulfonic acid, 1-amino-8-naphthol-2, 4-disulfonic acid, and 1-dibutylamino-8-naphthol-3,6-disulfonic acid.

*Example 6*

The diazo solution of Example 1 is added to a dilute acetic acid solution of 2-hydroxy-3-naphthoic acid, and when coupling is complete, the dye is filtered off, washed and dried. In place of 2-hydroxy-3-naphthoic acid, we may employ any Naphthol-A. S. compound as the coupling component. These reactions may also be carried out on fabrics such as cotton goods by the well known "ice color" process.

*Example 7*

1 mole of p-aminophenyl hypophosphorous aminobenzene is diazotized with sodium nitrite in the usual manner, and added to a cold dilute hydrochloric acid solution containing 1 mole of 2,6-diaminopyridine. The coupling reaction is brought to completion by the addition of sodium acetate, and the dye filtered off, washed and dried. Cellulose acetate is colored yellow shades from an aqueous suspension of the dye.

The azo compound obtained has the formula:

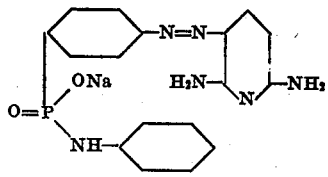

In place of 2,6-diaminopyridine, we may use 4-methyl-2,6-diaminopyridine. Similarly in place of the above diazotization component, there may be substituted

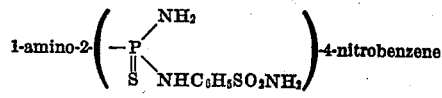

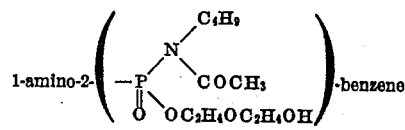

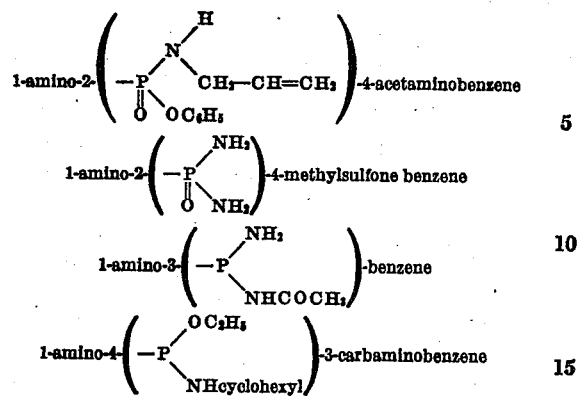

and the compound illustrated by the following formula:

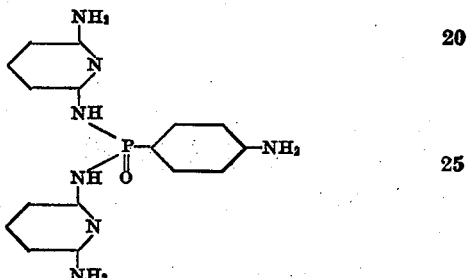

The azo compounds obtained with the components above mentioned, in addition to being valuable dyes for cellulose acetate, also appear to be of value in the treatment of urinary diseases.

The scope of our invention will be more fully apparent by reference to the following table, wherein are disclosed various suitable diazotization and coupling components, the dyes resulting therefrom coloring cellulose acetate fibers the shades of color designated. In each diazotization formula, it will be understood that the phosphorus group, as well as other substituent groups may be in any ortho, meta, or para position, in accordance with the variable possibilities of the specific amine disclosed.

| | Diazo component | Coupling component | Shade on cellulose acetate |
|---|---|---|---|
| (1) | 1-amino-4-(—P(=O)(NH$_2$)(NH$_2$))benzene | Methone | Green-yellow. |
| (2) | 1-amino-3-(—P(=O)(NH$_2$)(NHC$_4$H$_9$))benzene | do | Do. |
| (3) | 1-amino-2-(—P(=O)(NHCH$_3$)(NHC$_2$H$_5$))benzene | do | Do. |
| (4) | 1-amino-2-(—P(=O)(NHC$_6$H$_5$)(NH cyclohexyl))benzene | do | Do. |
| (5) | 1-amino-2-(—P(=O)(NHCH$_2$—CH(CH$_2$)(CH$_3$)O)(NHCONH$_2$))benzene | do | Do. |
| (6) | 1-amino-2-chloro-4-(—P(=O)(NH$_2$)(NH$_2$))benzene | do | Do. |

| Diazo component | Coupling component | Shade on cellulose acetate |
|---|---|---|
| (7) 1-amino-2-bromo-4(—P(NH₂)(OCH₃)=O)benzene | Methone | Green-yellow. |
| (8) 1-amino-2(—P(NH₂)(NH₂)=O)-4-nitrobenzene | do | Do. |
| (9) 1-amino-2-nitro-4(—P(NH₂)(NHC₂H₄OH)=O)benzene | do | Do. |
| (10) 1-amino-2(—P(NH₂)(NH₂)=O)-4-nitrobenzene | do | Do. |
| (11) 1-amino-2(—P(OH)(OH)=O)-4-nitrobenzene | do | Do. |
| (12) 1-amino-4(—P(ONa)(ONa)=O)-2-nitrobenzene | do | Do. |
| (13) 1-amino-6(—P(NH₂)(NH₂)=O)-2,4-dinitrobenzene | do | Do. |
| (14) 1-amino-2(—P(NH₂)(NHC₂H₄OH)=O)-6-hydroxybenzene | do | Do. |
| (15) 1-amino-2(—P(NHCH₂—CH=CH₂)(NHC₂H₄OCH₃)=O)-6-anisol | do | Do. |
| (16) 1-amino-2(—P(N(CH₃)₂)(N(CH₃)(C₆H₅))=O)-6-benzamide | do | Do. |
| (17) 1-amino-4(—P(NH₂)(OH)=O)-6-phenylsulfonamide | do | Do. |
| (18) 1-amino-4(—P(NH₂)(NH₂)=O)benzene | do | Do. |
| (19) 1-amino-4(—P(OH)(OH))benzene | do | Do. |
| (20) 1-amino-4(—P(NH₂)(OK))-3-bromobenzene | do | Do. |
| (21) 1-amino-4(—P(OH)(OCH₃))-2-bromobenzene | do | Do. |
| (22) 1-amino-2(—P(OH)(NHCH₃))-2-chlorobenzene | do | Do. |
| (23) 1-amino-2(—P(NHC₆H₅)(NH cetyl))-3-nitrobenzene | do | Do. |
| (24) 1-amino-3(—P(NHCH₃)(NHCH₃))-6-benzamide | do | Do. |

| Diazo component | Coupling component | Shade on cellulose acetate |
|---|---|---|
| (25) 1-amino-2(−P(OH)(NHCH₃))-6-phenylsulfonamide | Methone | Green-yellow. |
| (26) 1-amino-2(−P(ONa)(N(CH₃)₂))-6-hydroxybenzene | do | Do. |
| (27) 1-amino-2(−P(=S)(NH₂)(NHCH₂C₆H₅))benzene | do | Do. |
| (28) 1-amino-4(−P(=S)(NH₂)(NHC₄H₉))benzene | do | Do. |
| (29) 1-amino-3(−P(=S)(NH₂)(NHC₂H₄OH))-6-chlorobenzene | do | Do. |
| Amines 1-29 | Methyldihydroresorcinol | Green-yellow. |
| Do | Barbituric acid | Do. |
| Do | p-Cresol | Yellow. |
| Do | 1-phenyl-3-methyl-5-pyrazolone | Orange-yellow. |
| Do | Dimethylaniline | Yellow to violet. |
| Do | Glycerylaniline | Do. |
| Do | β-hydroxyethyl-m-toluidine | Do. |
| Do | β-hydroxyethyl cresidine | Yellow to purple. |
| Do | β-hydroxyethyl-2,5-dimethoxy aniline | Do. |
| Do | γ-hydroxypropyl-2,5-diethoxy aniline | Do. |
| Do | β-sulfatoethyl-m-toluidine | Do. |
| Do | β-sulfoethyl-m-anisidine | Do. |
| Do | β-phosphatopropyl aniline | Yellow to violet. |
| Do | 1-β-hydroxyethylamino-5-naphthol | Orange-blue-green. |
| Do | Diphenylamine | Yellow to wine. |
| Do | Methyl-m-toluidine | Yellow to violet. |
| Do | Di-β-hydroxyethylaniline | Do. |
| Do | Di-β-hydroxyethyl-m-toluidine | Do. |
| Do | Di-β-hydroxyethyl cresidine | Yellow to purple. |
| Do | Ethyl glycerylaniline | Yellow to violet. |
| Do | Ethyl glyceryl cresidine | Yellow to purple. |
| Do | Ethyl-β-hydroxyethyl cresidine | Do. |
| Do | Ethyl-β-sulfoethylaniline | Do. |
| Do | m-Phenylene diamine | Red. |

In the application of the azo compounds of our invention to the coloration of organic derivatives of cellulose, silk and wool, the dye compound is ordinarily applied to the material to be colored from an aqueous solution or suspension of the dye. If the particular dye is insoluble or only slightly soluble in water, it is first ground to a paste with a dispersing agent such as a soap, a sulfonated oil, or a higher fatty acid glyceryl sulfate, and the resulting paste then dispersed in water. The material to be colored is immersed in this dispersion starting with a bath temperature of approximately 45-55° C., and then gradually increasing the temperature to 80-85° C., at which point it is maintained for several hours. Sodium chloride may be added during the dyeing operation to facilitate exhaustion of the dye bath. When the material has acquired the desired shade, it is removed from the bath, washed with soap, rinsed and dried. If on the other hand, the particular dye is water-soluble, the material may be colored directly from an aqueous solution of the dye without the necessity of employing a dispersing or solubilizing agent. For a more detailed description as to how the water-soluble azo dyes of our invention may be employed for the coloring of fibrous materials, reference may be had to McNally and Dickey, U. S. Patent No. 2,107,898, issued February 8, 1938.

While our invention is illustrated more particularly in connection with cellulose acetate, a material to which the invention is especially adapted, it will be understood that the azo dyes above described are not limited exclusively to cellulose acetate, but are likewise applicable for coloring organic derivatives of cellulose in general, including both the hydrolyzed as well as the unhydrolyzed organic acid esters of cellulose such as cellulose formate, cellulose acetate, cellulose propionate, cellulose butyrate, and the hydrolyzed as well as the unhydrolyzed mixed organic acid esters of cellulose such as cellulose acetate-propionate, cellulose ethers such as methyl cellulose, ethyl cellulose, and benzyl cellulose.

We claim:

1. The azo compounds having the general formula:

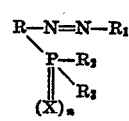

wherein R represents an aryl nucleus of the benzene series, R₁ represents a member selected from the group consisting of a benzene nucleus, a naphthalene nucleus, and a heterocyclic nucleus, X represents an atom of oxygen or sulphur, $n$ represents zero or the numeral 1, and R₂ and R₃ each represent a member selected from the group consisting of an amino group, an alkylamino group, a hydroxyalkylamino group, an alkoxyalkylamino group, an acetamino group, a cyclohexylamino group, a tetrahydrofurfurylamino group, a carbamino group, an alkylene amino group, an aminopyridylamino group, a phenylamino group, and the group OZ, wherein Z represents a member selected from the group consisting of hydrogen, an alkyl group, a phenyl group, and an alkali forming metal.

2. The azo compounds having the general formula:

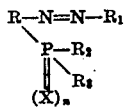

wherein R and R₁ each represent an aryl nucleus of the benzene series, X represents an atom of oxygen or sulphur, n represents zero or the numeral 1, and R₂ and R₃ each represent a member selected from the group consisting of an amino group, an alkylamino group, a hydroxyalkylamino group, an alkoxyalkylamino group, an acetamino group, a cyclohexylamino group, a tetrahydrofurfurylamino group, a carbamino group, an alkylene amino group, an aminopyridylamino group, a phenylamino group, and the group OZ, wherein Z represents a member selected from the group consisting of hydrogen, an alkyl group, a phenyl group, and an alkali forming metal.

3. The azo compounds having the general formula:

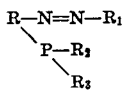

wherein R and R₁ each represent an aryl nucleus of the benzene series, and R₂ and R₃ each represent a member selected from the group consisting of an amino group, an alkylamino group, a hydroxyalkylamino group, an alkoxyalkylamino group, an acetamino group, a cyclohexylamino group, a tetrahydrofurfurylamino group, a carbamino group, an alkylene amino group, an aminopyridylamino group, a phenylamino group, and the group OZ, wherein Z represents a member selected from the group consisting of hydrogen, an alkyl group, a phenyl group, and an alkali forming metal.

4. The azo compounds having the general formula:

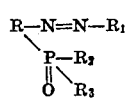

wherein R and R₁ each represent an aryl nucleus of the benzene series, and R₂ and R₃ each represent a member selected from the group consisting of an amino group, an alkylamino group, a hydroxyalkylamino group, an alkoxyalkylamino group, an acetamino group, a cyclohexylamino group, a tetrahydrofurfurylamino group, a carbamino group, an alkylene amino group, an aminopyridylamino group, a phenylamino group, and the group OZ, wherein Z represents a member selected from the group consisting of hydrogen, an alkyl group, a phenyl group, and an alkali forming metal.

5. The azo compounds having the general formula:

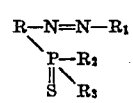

wherein R and R₁ each represent an aryl nucleus of the benzene series, and R₂ and R₃ each represent a member selected from the group consisting of an amino group, an alkylamino group, a hydroxyalkylamino group, an alkoxyalkylamino group, an acetamino group, a cyclohexylamino group, a tetrahydrofurfurylamino group, a carbamino group, an alkylene amino group, an aminopyridylamino group, a phenylamino group, and the group OZ, wherein Z represents a member selected from the group consisting of hydrogen, an alkyl group, a phenyl group, and an alkali forming metal.

6. The azo compounds having the general formula:

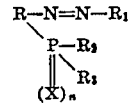

wherein R represents an aryl nucleus of the benzene series, R₁ represents a member selected from the group consisting of a m-phenylene diamine nucleus, and a 1,3-diamino naphthalene nucleus, X represents an atom of oxygen or sulphur, n represents zero or the numeral 1, and R₂ and R₃ each represent a member selected from the group consisting of an amino group, an alkylamino group, a hydroxyalkylamino group, an alkoxyalkylamino group, an acetamino group, a cyclohexylamino group, a tetrahydrofurfurylamino group, a carbamino group, an alkylene amino group, an aminopyridylamino group, a phenylamino group, and the group OZ, wherein Z represents a member selected from the group consisting of hydrogen, an alkyl group, a phenyl group, and an alkali forming metal.

7. The azo compounds having the general formula:

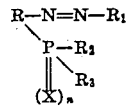

wherein R represents an aryl nucleus of the benzene series, R₁ represents a 2,6-diamino pyridine nucleus, X represents an atom of oxygen or sulphur, n represents zero or the numeral 1, and R₂ and R₃ each represent a member selected from the group consisting of an amino group, an alkylamino group, a hydroxyalkylamino group, an alkoxyalkylamino group, an acetamino group, a cyclohexylamino group, a tetrahydrofurfurylamino group, a carbamino group, an alkylene amino group, an aminopyridylamino group, a phenylamino group, and the group OZ, wherein Z represents a member selected from the group consisting of hydrogen, an alkyl group, a phenyl group, and an alkali forming metal.

8. Material made of or containing an organic derivative of cellulose colored with a dye selected from the class of azo compounds having the general formula:

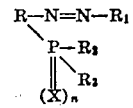

wherein R represents an aryl nucleus of the benzene series, R₁ represents a member selected from the group consisting of a benzene nucleus, a naphthalene nucleus, and a heterocyclic nucleus, X represents an atom of oxygen or sulphur, n represents zero or the numeral 1, and R₂ and R₃ each represent a member selected from the group consisting of an amino group, an alkylamino group, a hydroxyalkylamino group, an alkoxyalkylamino group, an acetamino group, a cyclohexylamino group, a tetrahydrofurfurylamino group, a carbamino group, an alkylene amino group, an aminopyridylamino group, a phenylamino group, and the group OZ, wherein Z represents a member selected from the group consisting of hydrogen, an alkyl group, a phenyl group, and an alkali forming metal.

9. Material made of or containing cellulose acetate colored with a dye selected from the class of azo compounds having the general formula:

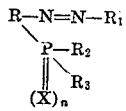

wherein R represents an aryl nucleus of the benzene series, $R_1$ represents a member selected from the group consisting of a benzene nucleus, a naphthalene nucleus, and a heterocyclic nucleus, X represents an atom of oxygen or sulphur, $n$ represents zero or the numeral 1, and $R_2$ and $R_3$ each represent a member selected from the group consisting of an amino group, an alkylamino group, a hydroxyalkylamino group, an alkoxyalkylamino group, an acetamino group, a cyclohexylamino group, a tetrahydrofurfurylamino group, a carbamino group, an alkylene amino group, an aminopyridylamino group, a phenylamino group, and the group OZ, wherein Z represents a member selected from the group consisting of hydrogen, an alkyl group, a phenyl group, and an alkali forming metal.

JOSEPH B. DICKEY.
JAMES G. McNALLY.